June 27, 1944.  L. D. GOFF ET AL  2,352,317
ROTARY SYPHON JOINT ASSEMBLY
Filed Jan. 16, 1941
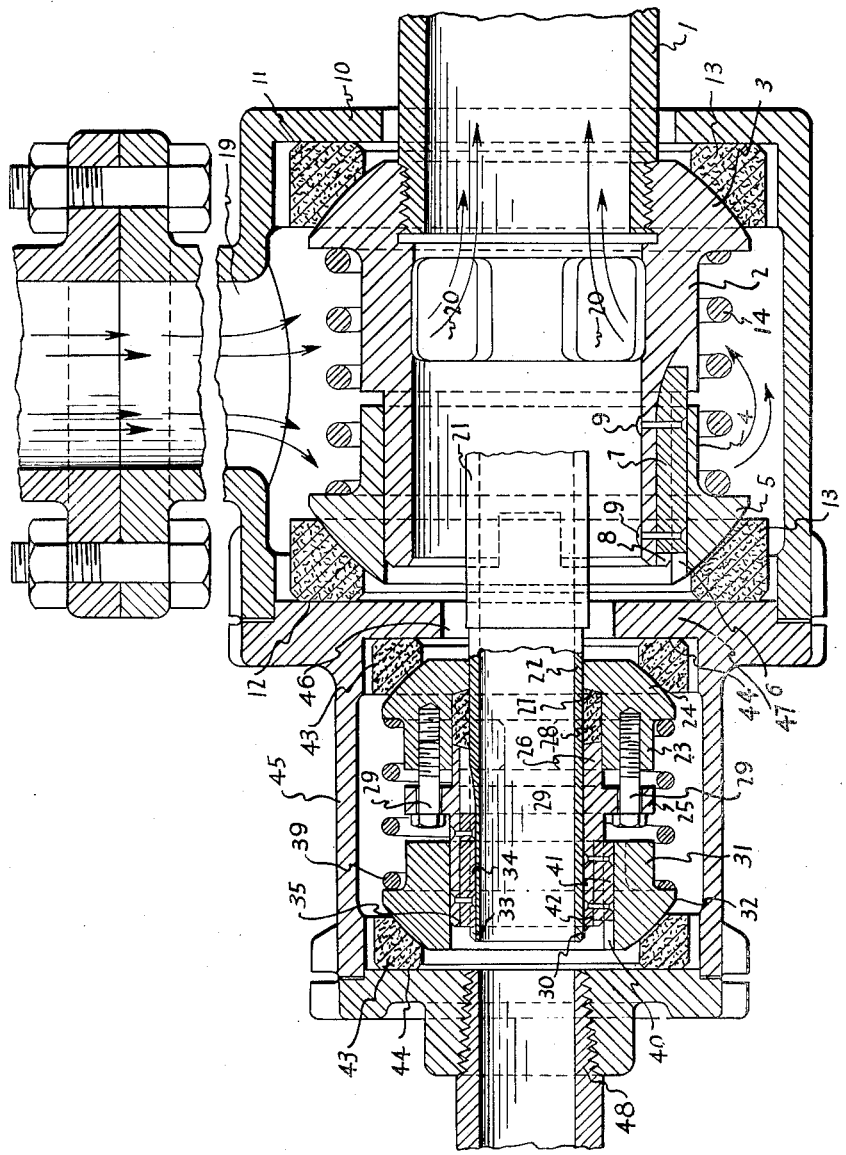
Inventors
LEONARD D. GOFF and
ROLLO O. MONROE
By Beaman + Langford
Attorney Patented June 27, 1944

2,352,317

UNITED STATES PATENT OFFICE 2,352,317

ROTARY SIPHON JOINT ASSEMBLY

Leonard D. Goff and Rollo O. Monroe, Three Rivers, Mich., assignors to The Johnson Corporation, Three Rivers, Mich., a corporation of Michigan Application January 16, 1941, Serial No. 374,670

7 Claims. (Cl. 285—10)

The present invention relates to improvements in rotary pressure joints and more particularly to an improvement to the joint construction shown in Patent No. 1,929,635, to L. D. Goff.

The joint disclosed in the above identified patent is for supplying steam to rotary drums and for removing the condensate therefrom. According to the above identified patent, the condensate is removed by a pipe fixed with respect to the joint casing. According to the present invention, the condensate pipe is rotatable with respect to the joint casing.

In order to permit relative rotation between the condensate pipe and the joint casing, provision must be made to take up any irregular or eccentric movement of the condensate pipe, or of the joint casing. The joint according to the present invention provides for such irregular or eccentric movement on the part of the condensate pipe, and in addition provides for relative longitudinal movement of the condensate pipe.

Accordingly, an object of the invention is to provide in combination with a rotary joint a second rotary joint having a fluid conducting pipe associated therewith passing through with the first rotary joint.

Another object of the invention is to provide a compound rotary joint for nested pipes.

Still another object of the invention is to provide a rotary joint permitting relative axial movement between the joint members.

These and other objects residing in the arrangement, combination and construction of the parts will be apparent from the following specification when taken with the accompanying drawing which is a vertical section disclosing details of the invention.

Referring particularly to the drawing, the reference character 1 indicates a nipple having appropriate connections with a rotary drum or the like to which steam is to be supplied. Threaded to the nipple 1 is a tubular member 2 having on one end thereof an annular shoulder 3 in the form of a spherical segment. The other end of the member 2 has telescoped thereover a sleeve 4 having on its outer end an annular shoulder 5 in the form of the spherical segment. The sleeve 4 is provided with a keyway 6 in which is disposed a key 7 in turn secured in a slot 8 in the member 2 by rivets 9. Thus, the sleeve 4 is keyed to the member 2 for rotation therewith, while being capable of longitudinal movement with respect thereto.

A housing 10 is provided for enclosing the shoulders 3 and 5 and their associated structure, and at the ends of the housing 10 are provided radially extending, flat, annular seats 11 and 12. Disposed between the seat 12 and the segment 5 and the seat 11 and the segment 3 are bearing rings 13, having flat faces for bearing against the seats 11 and 12 respectively, and spherical faces for bearing against the segments 3 and 5 respectively. The segments 3 and 5 are urged outwardly by a helical spring 14 disposed about the member 2 and the sleeve 4, as shown, to force the segments 3 and 5 against the bearing rings 13 and the bearing rings 13 against their respective seats 11 and 12.

At one side of the housing 10 is provided a fluid inlet 19, arranged to be connected in a suitable manner to a source of steam. The member 2 is provided, between the segments 3 and 5, with a plurality of circumferentially spaced ports 20. Thus, steam entering the fluid inlet 19 passes through the ports 20 and the nipple 1. The construction thus far described provides a rotary joint whereby a fluid passage is provided from a fixed member to a rotary member and in one use to which the present invention may be put, provides a connection for the supplying of steam from a fixed source to a rotary drum.

Condensate from the drum or the like to which nipple 1 is connected is removed through a pipe 21 extending through the rotary joint and the nipple 1 to the interior of the drum or the like. The pipe 21 has the outer end thereof turned down to provide a tubular extension 22. Slidably disposed on the extension 22 is a member 23 having an annular shoulder 24, in the form of a spherical segment. Also, relatively slidably on the portion 22 is a member 25. The member 25 is provided with a stuffing box gland 26 for cooperation with a stuffing box 27 provided in the member 23 about the extension 22. The stuffing box 27 is filled with a packing 28 and the gland 26 is drawn into the stuffing box 27 by cap screws 29, threadably engaging with the member 23.

The member 25 is also provided with a sleeve 30, slidable on the extension 22 of the pipe 21 and comprises an extension in the opposite direction of the stuffing box gland 26. Slidable on the exterior surface of the sleeve 30 is a telescoping sleeve 31 provided at the outer end thereof with an annular shoulder 32 in the form of a spherical segment.

The extension 22 is provided with a keyway 33 in which slides a key 34, disposed in a slot 35 in the sleeve 30, and riveted therein. The sleeve 31 is provided with a keyway 40, having slidably disposed therein a key 41, disposed in a slot 42 in the sleeve 30 and riveted therein. Thus, the extension 22 is keyed to the sleeve 30 and the sleeve 30 is keyed to the sleeve 31. The result is that the rotating tubular extension 22 drives the sleeve 30, and the sleeve 30 drives the sleeve 31 and with it the annular shoulder 32, while at the same time permitting relative axial movement between the tubular extension 22 and the sleeve 30 and between the sleeve 30 and the annular shoulder 32.

Disposed about the sleeve 31 and the member 23 is a helical spring 39, resiliently urging the annular shoulders 24 and 32 apart. The convex surfaces of the annular shoulders 24 and 32 bear against concave surfaces on bearing rings 43, which in turn bear against flat, annular, radially extending seats 44 at the opposite ends of a supplementary housing 45, provided for enclosing the annular shoulders 24 and 32 and their associated parts, the bearing rings 43 being provided with flat, annular, radially extending surfaces for cooperating with the seats 44. As shown in the drawing, the housings 10 and 45 are secured together and the pipe 21 and its tubular extension 22 in extending from the housing 10 into the housing 45 pass through an opening 46 in the common end wall 47, separating the housings 10 and 45. The housing 45 is provided with a fluid connector 48.

In the operation of the rotary joint according to the present invention, the housings 10 and 45 secured together are maintained relatively fixed, while the supply nipple 1 is connected to a rotary drum or the like, which is to receive steam or other fluid. Steam enters through the inlet 19, passes through the ports 20 and through the nipple 1 to the interior of the drum, the rotary joint permitting the nipple 1 to rotate while maintaining a fluid tight passage to the inlet 19. The condensate pipe 21 extends through the nipple 1 to the interior of the drum where, according to one use to which the invention may be put, it has an appropriate connection with structure rotating with the drum and extending close to the periphery thereof. By means of this structure and the pipe 21, the condensate is drained from the drum or the like and passes out of the fluid connector 48, the rotary joint associated with the condensate pipe 21 maintaining a fluid seal with the housing 45 during rotation of the condensate pipe 21.

The structure of the two rotary joints comprising the present invention permits irregular or eccentric movement of the nipple 1 and the condensate pipe 21 during operation without destroying the fluid seals. At the same time, the slip joint provided between the tubular extension 22 and the annular shoulders 24 and 32 and sealed by the stuffing box, permits relative axial movement of the condensate pipe 21 with respect to the rest of the structure, while still maintaining the fluid seal. At the same time, fluid passing through the inlet 19, the openings 20 and the nipple 1 is prevented from leaking into the condensate passage as defined by the condensate pipe 21, its extension 22, the housing 45, and the fluid connector 48.

While the present invention has been designed for maintaining the housings 10 and 45 stationary while permitting the rotation of the nipple 1 and the condensate pipe 21, it will be understood that within the scope of the invention the nipple 1 and the condensate pipe 21 may be held stationary while the housings 10 and 45 are rotated or the ports are subjected to any possible relative rotation. Furthermore, while the drawing discloses a preferred form of rotary joint for association with the nipple 1 and the condensate pipe 21, it is considered that in its broadest aspects of the invention other forms of specific rotary joints may be employed.

Having thus described our invention, what we desire to secure by Letters Patent and claim is:

1. In a joint of the character described, a pair of relatively rotatable fluid conducting members, said members being disposed together to provide a fluid passage, sealing means at the juncture of said members to prevent leakage of fluid from said passage, a second pair of relatively rotatable fluid conducting members disposed together to provide a second fluid passage, and sealing means at the juncture of said last named members to prevent leakage of fluid from said second passage, one member of said first pair being arranged so as to extend through one member of said second pair, said extending member of said first pair constituting a pipe and having one end thereof at said sealing means between said first pair, said last named sealing means having structure for supporting said end of said pipe in a direction normal to the axis of rotation thereof, whereby said end of said pipe is supported for rotation.

2. In a joint of the character described, a pair of relatively rotatable fluid conducting members, said members being disposed together to provide a fluid passage, sealing means at the juncture of said members to prevent leakage of fluid from said passage, a second pair of relatively rotatable fluid conducting members disposed together to provide a second fluid passage, and sealing means at the juncture of said last named members to prevent leakage of fluid from second passage, one member of said first pair being arranged so as to extend through one member of said second pair, and the other member of the first pair being rigid with the other member of the second pair, said extending member of said first pair constituting a pipe and having one end thereof at said sealing means between said first pair, said last named sealing means having structure for supporting said end of said pipe in a direction normal to the axis of rotation thereof, whereby said end of said pipe is supported for rotation.

3. In a joint of the character described, a pair of relatively rotatable fluid conducting members, said members being disposed together to provide a fluid passage, sealing means at the juncture of said members to prevent leakage of fluid from said passage, a second pair of relatively rotatable fluid conducting members disposed together to provide a second fluid passage, sealing means at the juncture of said last named members to prevent leakage of fluid from said second passage, one member of said first pair being arranged so as to extend through one member of said second pair, the other member of the first pair being rigid with the other member of the second pair, and means providing a slip joint between the members of the first pair to permit relative axial movement therebetween, said extending member of said first pair constituting a pipe and having one end thereof at said sealing means between said first pair, said last named sealing means having structure for supporting said end of said pipe in a direction normal to the axis of rotation thereof, whereby said end of said pipe is supported for rotation.

4. A joint of the character described comprising a housing having a pair of communicating aligned chambers, each of said chambers having a fluid connection therewith, and each of said chambers having a tubular fluid conducting member extending thereinto, one of said tubular members extending through the other of said tubular members and its chamber, said chambers and their respective tubular members being relatively rotatable, and sealing means between each chamber and its respective tubular member to provide separate fluid passages through said tubular means and chambers respectively, said sealing means being within the respective chambers.

5. A joint of the character described comprising a housing having a pair of communicating aligned chambers, each of said chambers having a fluid connection therewith, and each of said chambers having a tubular fluid conducting member extending thereinto, one of said tubular members extending through the other of said tubular members and its chamber, said chambers and their respective tubular members being relatively rotatable, sealing means within and between each chamber and its respectitve tubular member to provide separate fluid passages through said tubular means and chambers respectively, and a fluid sealed slip connection between the inner tubular member and its sealing means to provide for relative longitudinal movement between itself and its chamber.

6. The combination with a joint comprising a rotatable tubular member having spaced shoulders thereon slidable but non-rotatable relative to each other, means biasing said shoulders apart, said shoulders having outwardly facing convex bearing surfaces in the form of spherical segments, bearing rings having inwardly facing concave bearing surfaces directly co-acting with said convex bearing surfaces, and a casing having annular flat seats for said bearing rings, of a similar casing secured to said first named casing, a second rotatable tubular member, said second tubular member extending through said first tubular member, and a joint within said second casing between said second tubular member and said second casing, said casings having fluid connections therewith, whereby tubular passages are provided from said fluid connections through said tubular members respectively.

7. In a joint of the character described, a casing, a relatively rotatable tubular member therein, a shoulder slidable on said member, a sleeve slidable on said member, said shoulder defining with said member a stuffing box, one end of said sleeve comprising a stuffing box gland, means to operatively force said gland into said stuffing box, a second shoulder slidable on the other end of said sleeve, means keying said member to said sleeve, means keying said sleeve to said second shoulder, a fluid inlet in said casing, means to bias said shoulders apart, said shoulders having outwardly facing convex bearing surfaces in the form of spherical segments, bearing rings having inwardly facing concave bearing surfaces directly co-acting with said convex bearing surfaces, and seats at the opposite ends of said casing for said bearing rings, whereby said shoulders are biased into engagement with said rings and said rings are biased into engagement with said seats to provide a seal, said fluid inlet in said casing having communication with said tubular member.

LEONARD D. GOFF.
ROLLO O. MONROE.